United States Patent
Spies et al.

[11] Patent Number: 6,015,162
[45] Date of Patent: Jan. 18, 2000

[54] RESTRAINT SYSTEM FOR PASSENGERS IN VEHICLES

[75] Inventors: Hans Spies, Pfaffenhofen; Horst Daxer, Munich, both of Germany

[73] Assignee: DaimlerChrysler AG, Heilbronn, Germany

[21] Appl. No.: 08/065,857

[22] Filed: May 21, 1993

Related U.S. Application Data

[63] Continuation-in-part of application No. 07/747,126, Aug. 19, 1991, abandoned.

[30] Foreign Application Priority Data

Aug. 23, 1990 [DE] Germany ............................. 40 26 697

[51] Int. Cl.[7] ...................................................... B60R 21/32
[52] U.S. Cl. ............................ 280/735; 280/737; 280/741
[58] Field of Search ..................................... 280/734, 735, 280/736, 741, 806, 737; 102/530, 531

[56] References Cited

U.S. PATENT DOCUMENTS

| | | | |
|---|---|---|---|
| 4,117,730 | 10/1978 | Spies et al. ............................... | 307/121 |
| 4,167,276 | 9/1979 | Bell et al. ................................. | 280/731 |
| 4,209,185 | 6/1980 | St. Clair et al. .......................... | 280/734 |
| 4,552,380 | 11/1985 | Stevens .................................... | 280/734 |
| 4,561,675 | 12/1985 | Adams et al. ............................ | 280/736 |
| 4,597,251 | 7/1986 | Cornellier . | |
| 4,666,182 | 5/1987 | Breed ....................................... | 280/734 |
| 4,711,466 | 12/1987 | Breed ....................................... | 280/741 |

FOREIGN PATENT DOCUMENTS 3742383  6/1989  Germany ................................ 280/736

*Primary Examiner*—Paul N. Dickson
*Attorney, Agent, or Firm*—McGlew and Tuttle, P.C.

[57] ABSTRACT

A vehicle's restraint system for passengers such as airbags, belt tighteners or similar devices to protect the passengers in case of a crash against injury includes a gas generator having a normally closed first housing including a solid fuel as a charge to generate gas. A closed second housing is provided, accommodating each of an evaluating circuit or sensor, triggering element and ignition structure. The closed second housing includes a portion which makes an active contact between the ignition structure in the second housing and the charge in the first housing. The two closed housings facilitate storage, assembly and environmentally safe disposal.

7 Claims, 2 Drawing Sheets

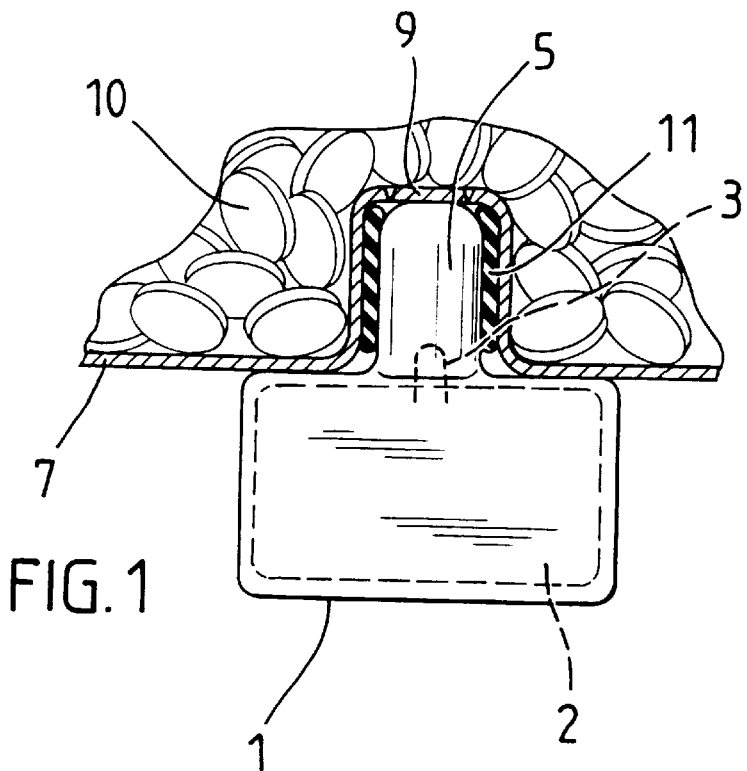
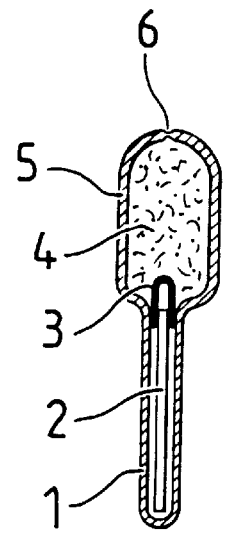
FIG. 1
FIG. 1a
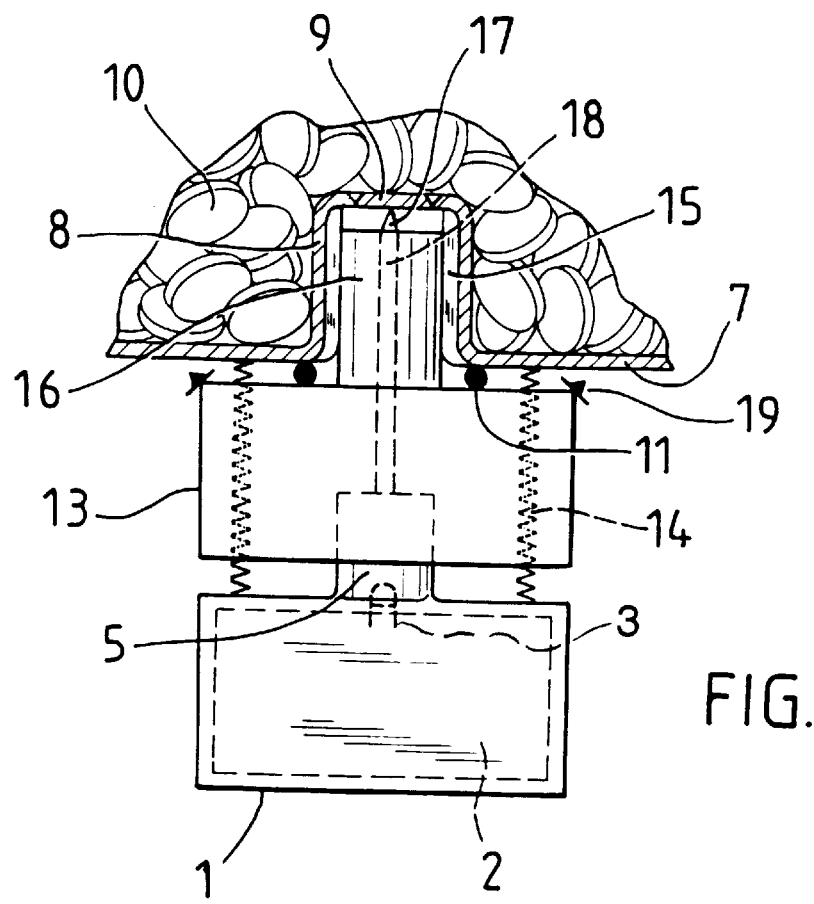
FIG. 2

RESTRAINT SYSTEM FOR PASSENGERS IN VEHICLES

CROSS REFERENCE TO RELATED APPLICATION

This application is a continuation-in-part of application Ser. No. 07/747,126 filed Aug. 19, 1991, now abandoned.

FIELD OF THE INVENTION

The present invention pertains to a restraint system for passengers in vehicles and more particularly to such systems employing gas generators to inflate a protective device such as a gas cushion (airbag), or to tension safety belts.

BACKGROUND OF THE INVENTION

Depending on the particular application, especially what type of vehicle, a crash or collision with another vehicle or an obstacle, the direction and magnitude of a shock, the efforts to be made to sufficiently protect a passenger against injuries are different, but sensing and evaluating the crash has to be done in the range of milliseconds in order to have enough time to inflate or to tension the above mentioned restraint system. An igniting device must be activated in order to ignite a fuel charge or propellant in the gas generator when triggered.

It is known from prior art, that the activation should be performed only when a distinct acceleration (or deceleration in the same order but negative) is reached and was sensed by means of a moveable spring-and-weight sensing and/or triggering system. These have primarily been referred to as the mechanical sensor. Such sensor systems are described and shown in U.S. Pat. Nos. 4,167,276, 4,711,466 and 4,552,380.

Because electronic sensor systems could sense and evaluate more eventualities regarding vehicle type and crash events they have become widespread in practice, than mechanical sensors. However to avoid influences of electromagnetic waves or the possible influence of High Frequencies (HF), from radio stations and the like, in electronic circuits in vehicles during operation, most of the known electronic sensors for restraint systems have—for safety reasons also a special safing sensor in form of a mechanico-electrical switch, normally open, and closed only when a substantial velocity change occurs.

In addition, the prior art devices of restraint systems have a solid fuel-filled gas generator to inflate an airbag or to tension a belt tensioner and an igniter/primer is structurally integrated with the gas generator housing.

In practice a gas generator in a ready-to-operate state poses a potential hazard with regard to the installation of the generator into a vehicle in two respects:

a) electrically: all electrical connections must be periodically checked to ensure proper functioning, and b) chemically: car manufacturers desire guaranties as to safety against any form of leaks in the gas generator and also against self ignition of the gas generator fuel within the normal lifetime of such vehicle. Furthermore since in known systems the igniter/primer and the solid fuel (main charge) are integrated in the gas generator housing, the disposal of such units which must be disposed off, even after years of non-use, is a burden to environment.

SUMMARY AND OBJECTS OF THE INVENTION

It is an object of the present invention to provide a safety device in which both the electrical and the chemical hazard potentials are reduced, and those parts with critical fillings could be separated from other parts, some parts for conditioning, other parts for recycling or disposal such that these components will no longer be a burden on the environment, allowing the environment to be protected for the future.

According to the invention the restraint system for passengers in vehicles comprises a gas generator including a solid fuel as a charge to generate gas within one (first) closed housing, normally closed, and a- second normally closed housing is in non-use separated from said first housing. The second housing includes acceleration-responsive signal detecting and evaluating means, triggering means and the ignition means. These elements are so to speak all the critical parts as to the electrical and chemical aspects. Since the second housing is in non-use separated from the first housing the aforesaid electrical and chemical hazard problems can be avoided with the invention because both housings are tightly closed and cannot come into contact with each others fillings other than at will. The Invention provides structure requiring predetermined events (crash) for activation.

The gas generator housing advantageously is of such thickness as to withstand temperatures which may be encountered and to withstand generated pressure.

The second housing is preferably electromagnetically shielded against electro motive force (emf) and high frequency (HF), the electronic sensing and evaluating and triggering components are preferably surface-mounted on a single chip—tested after fabrication—and fixed to the igniting means so that no more checks may be necessary. There is preferably included both the electrical igniter and igniting mixture or primer within its envelope and/or housing.

The functional connection between the gas generator housing filled with the charge to generate the gas necessary for inflation or tensioning is preferably advantageously to be done in operation by making an active contact between said ignition means (and/or igniting mixture or a primer) in said second housing and the charge in said first housing with a moveable mass and energy storing means associated thereto. The moveable mass, of a predetermined weight, is moveable under the external influence of the inertial force and is held against movement with energy storing means such as spring means. The mass and the energy storing means are situated between the first housing and the second housing, are normally separated (1st position) from each other, but are moveable relative to each other, to get in contact (2nd position) if activated. The energy storing means are held in the (1st) position of higher energy equilibrium up to the moment an acceleration impulse reaches a predetermined amplitude and time under external influence, then going toward its (2nd) position of lower energy equilibrium. This eliminates the need for a special safing sensor.

Further of advantage are penetrating means including a penetrator for opening a part of the housing of the gas generator filled with the charge to generate gas for inflating or tensioning. The penetrator is guided in its movement by guidance means such as a tubular recess against a weakened part of said housing of the gas generator to rupture the part when said moveable mass is moving toward its position of lower equilibrium. The guiding means are tightened against the exterior by sealing means to ensure that ignition and combustion gases which are formed by ignition of an ignitor mixture or primer will get in contact directly with the said charge (main charge) of the gas generator at one end faced to the opposite end of the ignition means, and to ignite the said charge (main charge). This structure helps to both fix the steady state of non-use, and helps to ease operation when necessary that is only at predetermined conditions.

The electric ignition is preferred according to the invention and preferably includes an electrical igniter such as glowable wire, a bridge of distinct electrical resistance or capacitance, a squib, or a spark plug or similar electrical discharge means to ignite the gas or gases, when or after a triggering impulse appears.

For better understanding of the invention, its advantages, operation and specific objects attained by its uses, reference is made to the accompanying drawings and descriptive matter in which preferred embodiments of the invention are illustrated.

Persons skilled in the art are able to modify these embodiments without thereby going beyond the scope of the present invention.

Further advantages will become apparent from the following description given on the basis of the examples shown.

BRIEF DESCRIPTION OF THE DRAWINGS

In the drawings:

FIG. 1 is a partial sectional view showing the new protective device according to the invention;

FIG. 1a is a sectional view of the encapsulation or housing 1 in one unit together with vessel 5;

FIG. 2 is a view of another example of the invention similar to figure one but having a moveable mass associated with an energy storing means in between the first and second housing;

DETAILED DESCRIPTION OF THE PREFERRED EMBODIMENTS

Figure 3:
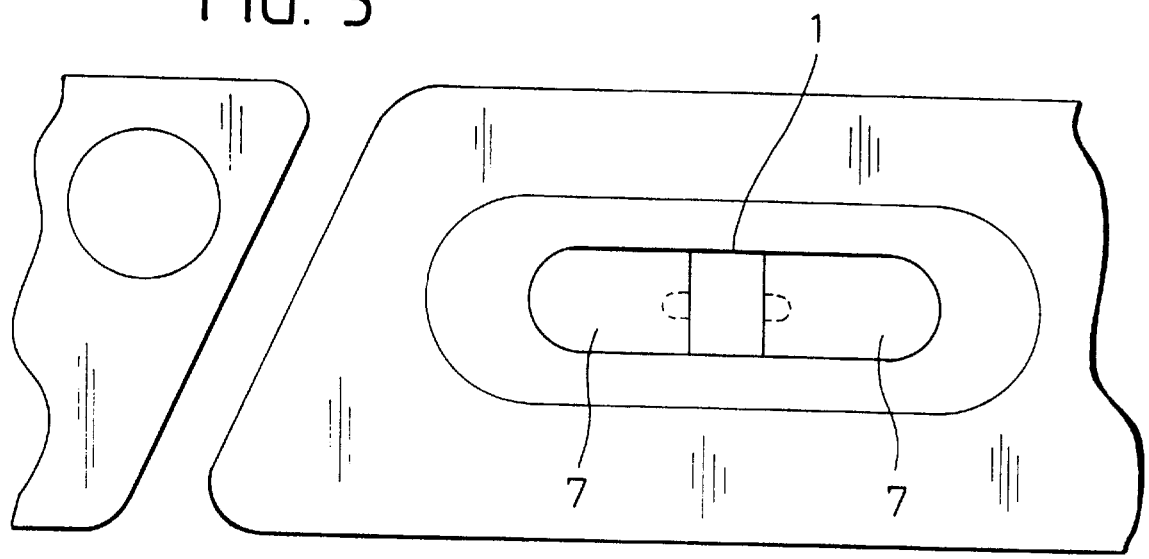
FIG. 3 is an example of the invention including devices arranged in a dashboard for the protection of occupants of a vehicle, such as a front passenger other than the driver.

As shown in FIG. 1, a housing 1 encapsulates a new unit according to the invention including one electronic integrated circuit preferably on a single chip 2. Ignition means such as an igniting mixture or a primer 4 is provided, to be ignited from an electric igniter 3 which is triggered from said IC when predetermined conditions are fulfilled. The primer 4 is packaged into an ampoule, or other tight cylindrical vessel which forms a prolongation of the encapsulation for chip 2, which is an electromagnetic shield therefore. Both parts of the encapsulation can be made of plastic or metal or of a metal/plastic laminate and may be fixed together, for example, by welding or the like tight fixation. The vessel 5 has, as shown in greater detail in FIG. 1a, a planar and a dome shaped end wall at the ends of the cylinder. The planar end wall is fixed to the housing 1 for chip 2, and has built into a glow wire or the like igniter The igniter in turn is electrically connected to chip 2, here to trigger outlet of said IC. Other igniters 3 which can be used are electric resistances or capacitances or the like electric discharge means, an electric squib, a spark ignition from spark plug etc.

A functional connection means is provided between the vessel 5 and the housing 7, in that the dome shaped end wall of vessel 5 is centrally weekend at 6 for breach after ignition of mixture or primer 4. The ignition generates high gas pressure to open the dome of said end wall at the weakened point or points 6 in the direction against a housing 7. The housing 7 is a housing of a normal gas generator but without ignition means. The dome shaped end is in contact with a circumferentially weakened portion 9, which is also part of the function connection means of cup shaped recess 8 in the wall of housing 7.

When ignited the burning gas of mixture or primer 4 by its developing pressure opens, upon the existing pressure differences at first vessel 5 at its central tip 6, and then like a valve or diaphragm, the portion 9 of housing 7. Between the outer diameter of vessel 5 and the inner diameter of the cup shaped recess 8 in wall 7 is inserted a seal 11 in the form of an elastic sleeve or at least one or two O-rings. The burning gases of primer or mixture (known per se as from ATZ Automobiltechnische Zeitschrift 84 (1982) page 78 to FIG. 4 as B—$KNO_3$-based) then in turn ignites the solid fuel of the gas generator known as tablets 10 of a known mixture such as also with respect to FIG. 4 of the same reference above, namely of $NaN_3$—$KNO_3$—$S10_2$-basis.

Instead of tablets the solid fuel 10 can be also in form of rings, pellets, granulates, globules, coarse and/or fine grains or the like. It can also be encapsulated in a tight package like a plastic or thin metal foil, such as aluminum and at least partly evacuated. Such metal foil could be fixed or used instead of weakened portion 9 of the wall 7 of gas generator to get in contact with the dome shaped end wall 6 of vessel 5 including the primer or mixture 4 ignitable by an electric impulse, for example through glow wire or other igniter 3, when triggered. The encapsulation of vessel 5, together with encapsulation of chip 2 is such as to avoid high temperatures which could lead to self-ignition of primer or mixture 4. The same is true with wall 7 of the housing of gas generator, its material and thickness and heat transfer characteristics and with respect to solid fuel 10 thereof as mentioned above.

FIG. 1 and 2 shows an embodiment of the present invention, in which the second housing 1 encapsulates an electronic integrated circuit (IC) on chip 2 and the ignition means 3 and 4, for example separately packaged, but encapsulated the same way or preferably by the same encapsulation. The electronic circuit in all of the embodiments of the invention may be the same for example as that described in U.S. Pat. No. 4,117,730 of the same inventor Spies et al. U.S. Pat. No. 4,117,730 is hereby incorporated by reference. It includes a sensor to detect an acceleration or deceleration signal electronic components in an integrated circuit to evaluate the signals detected by said sensor or sensors with the aid of threshold valued switching means, an energy source—of its own—, integrator and comparator means, and decision making after comparison with thresholds. This structure forms trigger means to trigger the ignition means by releasing an electric impulse to the igniter such as a glow wire at the primer which in turn ignites than the solid fuel as the (main) charge in the gas generator to be ignited, but only in case of evaluated crash events, here only when a predetermined acceleration (or deceleration) is exceeded.

In FIG. 2 there is described and shown a system in which the two housings 1 and 7, normally closed with their encapsulations for the two different solid fuels, the one to ignite the other, have an idle or first position in which they are separated from each other, and an active or second position in which they are in contact with each other, so as to ignite the main charge of solid fuel in the gas generator housing, for example to inflate an airbag or to stress a belt tensioner in a manner known per se by means of a piston moveable within a cylinder together with tensioning means, like a rope.

In between the second housing 1 and the first housing 7 there is arranged a spring-weight system to store kinetic energy at a first and higher equilibrium held in its idle position, and a second lower equilibrium position, reached at the end of relative movement between the two casings 1 and 7. The mass 13 is connected to the casing 1 to provide an overall mass which mass is greater than the original casing 1 (by a predetermined amount) and therefore movable more readily under inertial forces. The movement of a moveable mass 13 of a predetermined weight is only possible if released under the preset conditions namely under external influence (like an inertia force or the multiple thereof (like 4 times the acceleration of the earth). Release of the springs 14 occurs when an acceleration (or deceleration) reaches its predetermined amplitude and time (duration). Then the mass 13 together with the housing 1 combined therewith, is moved towards the housing 7 in guide means such as rails 15 in between the inner diameter of the cup-shaped recess 8 and outer diameter of cylinder 16 of the mass corresponding to cylinder 5 and its outer diameter. This action results in moving a penetrator 17 at the tip of a hollow needle 18 in prolongation of cylinder 5 of housing 1 into a weakened portion 9 of housing 7 likewise as described with respect to FIG. 1 thereabove, but only when stop or hold-on means 19 set free or release the spring and weight system 13, 14 in the right direction toward its active or second position to ignite the (main) charge in the gas generator only at will, here according to the invention, only in a safe and useful manner and keeping in mind the aspects necessary to protect the environment of the earth. Appropriate openings are provided at the tip of hollow needle 18 allowing ignition (through the needle, out the openings and into contact with the charge). An appropriate seal 11 is provided (such as an o-ring as shown in FIG. 2).

The arrangement shown in FIG. 3 is such that one second housing 1 of the above, is combined with two first housings 7 as above, preferably connected in such manner as described in connection with FIG. 1 herewith, with the sole difference that there are two cylinder parts 5 of encapsulation 1 which are in contact with two cup-shaped recessed parts of housings 7 of the gas generators and a seal in between. The protective cushions thereof are so arranged, that they are movable against the viewer looking on the drawings in FIG. 3 and FIG. 4.

Figure 4:
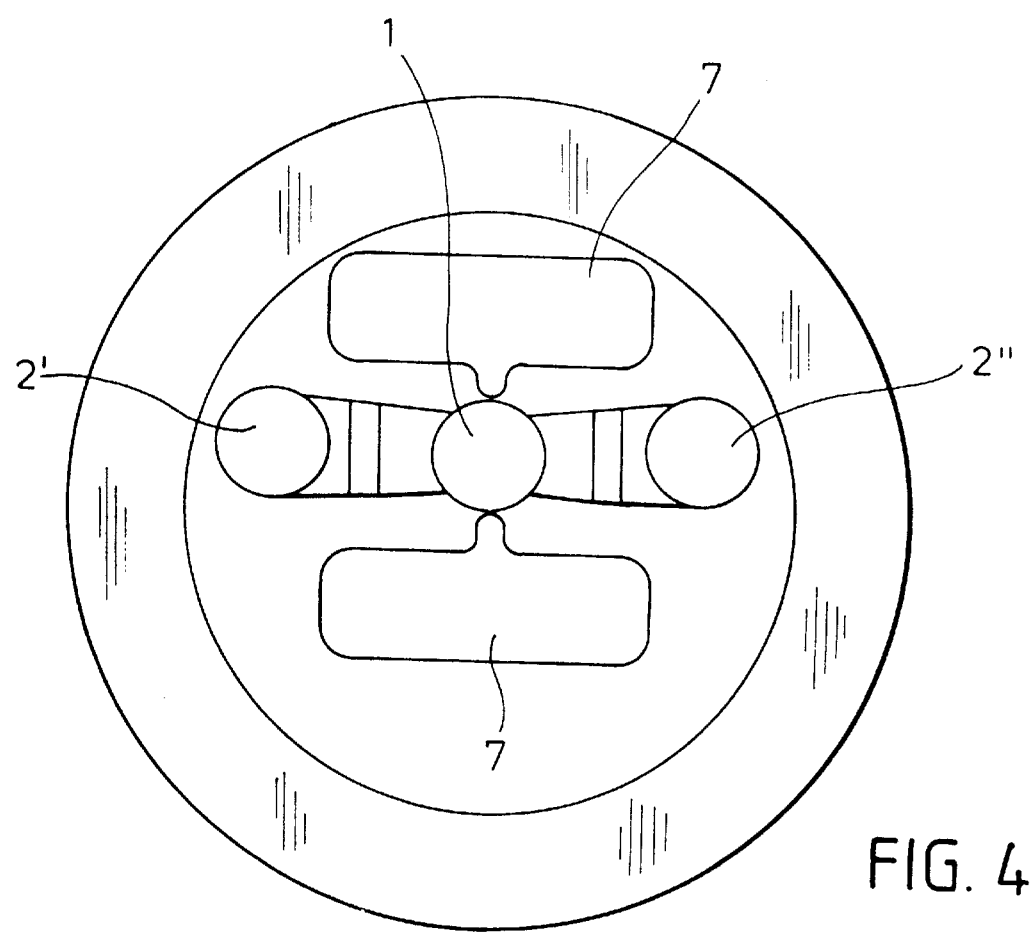
FIG. 4 is an example of the invention, the protective device being incorporated in a steering wheel for protection of a driver, especially of a motor vehicle, with an airbag.

FIG. 4 shows an example of the invention to protect a driver of a vehicle, installed here in the pot of the steering wheel The protective system can be the same as in FIG. 1 if a single airbag is planned to inflate or it can be chosen as in FIG. 3 if one encapsulation 1 is combined with two gas generator housings 7 to inflate two airbags or the like, e.g. to protect head and breast separately. Further combinations and alterations could be made without leaving the scope of the invention in accordance with the accompanied claims.

While specific embodiments of the invention have been shown and described in detail to illustrate the application of the principles of the invention, it will be understood that the invention may be embodied otherwise without departing from such principles.

What is claimed is:

1. A vehicle's restraint system for passengers such as airbags, belt tighteners or similar devices to protect the passengers in case of a crash against injury, the system comprising:

a gas generator having a normally closed first housing including a solid fuel as a charge to generate gas;

electric ignition means for initiating ignition of said charge;

evaluating means connected to said ignition means, said evaluating means including an acceleration-responsive signal generator for detecting when at least one predetermined threshold is exceeded and then activating said ignition means by triggering means for generating a triggering impulse;

a closed second housing defining a vessel which is separate from said first housing, said evaluating means, said triggering means and said ignition means being incorporated in said closed second housing, said closed second housing including a portion which makes contact with said first housing, positioning said ignition means adjacent to said charge in said first housing.

2. A restraint system according to claim 1, wherein:

said ignition means includes one of an electrical igniter, a glowable wire, a bridge of distinct electrical impedance, a squib, a spark plug, and electrical discharge means for ignition of an ignitable material when a triggering impulse appears.

3. A restraint system according to claim 1, wherein:

said closed first housing defines a cup shaped recess and said portion of said second housing is cylindrical, dimensioned to be positioned in said cup shaped recess.

4. A restraint system according to claim 1, further comprising:

a weakened portion provided in said first housing; and a weakened portion provided in said second housing, said first housing weakened portion positioned adjacent to a location wherein said ignition means in said second housing is adjacent to said charge in said first housing and said second housing weakened portion being positioned at a location wherein said ignition means in said second housing is adjacent to said charge in said first housing.

5. A restraint system according to claim 4, wherein:

said closed first housing defines a cup shaped recess and said portion of said second housing is cylindrical, dimensioned to be positioned in said cup shaped recess.

6. A restraint system for occupants of a vehicle using a gas generator, comprising:

an electrical igniter and a sensor device incorporated into a single housing to form a closed integral unit, said sensor device permitting activation of said electrical igniter in defined cases only, said closed integral unit including an extending cylindrical portion;

a gas generator housing defining a closed unit containing propellant therein, said closed unit being separate from said closed integral unit, said gas generator housing having a recess, said closed integral unit being functionally connected to said gas generator with said extending cylindrical portion extending into said recess, whereby forces generated upon ignition allow ignition gases to rupture part of said single housing at said cylindrical portion and rupture part of said gas generator housing at said recess to activate said propellant.

7. A vehicle's restraint system for passengers such as airbags, belt tighteners or similar devices to protect the passengers in case of a crash against injury, the system comprising:

a gas generator having a normally closed first housing including a solid fuel as a charge to generate gas;

electric ignition means for initiating ignition of said charge;

evaluating means connected to said ignition means, said evaluating means including an acceleration-responsive signal generator for detecting when at least one predetermined threshold is exceeded and then activating said ignition means by triggering means for generating a triggering impulse;

a closed second housing defining a vessel which is separate from said first housing, said evaluating means, said triggering means and said ignition means being incorporated in said closed second housing, said closed second housing including a portion which makes contact with said first housing, positioning said ignition means in said second housing adjacent to said charge in said first housing;

functional connection means for connecting and communicating said first housing and said second housing, said functional connection means including a weakened portion provided in said first housing adjacent said charge, and a weakened portion provided in said second housing positioned adjacent to said ignition means, said weakened portion in said second housing is also positioned adjacent to said weakened portion in said first housing, wherein said ignition means in said second housing is adjacent to said charge in said first housing.

* * * * *